(12) United States Patent
Fukasawa et al.

(10) Patent No.: US 7,210,293 B2
(45) Date of Patent: May 1, 2007

(54) HYDROSTATIC TRANSMISSION VEHICLE AND HYDROSTATIC TRANSMISSION CONTROLLER

(75) Inventors: Toshihiko Fukasawa, Komatsu (JP); Yutaka Sugimoto, Komatsu (JP); Eiji Ishibashi, Komatsu (JP); Shinobu Kamikawa, Komatsu (JP)

(73) Assignee: Komatsu Ltd., Tokyo (JP)

( * ) Notice: Subject to any disclaimer, the term of this patent is extended or adjusted under 35 U.S.C. 154(b) by 171 days.

(21) Appl. No.: 11/041,022

(22) Filed: Jan. 21, 2005

(65) Prior Publication Data

US 2006/0032221 A1  Feb. 16, 2006

(30) Foreign Application Priority Data

Jan. 21, 2004  (JP) ............................. 2004-012507

(51) Int. Cl.
*F16D 39/00* (2006.01)
(52) U.S. Cl. .......................... 60/487; 60/445
(58) Field of Classification Search ................ 60/431, 60/445, 487
See application file for complete search history.

(56) References Cited

U.S. PATENT DOCUMENTS 6,442,934 B1 * 9/2002 Okuda et al. .................. 60/487

FOREIGN PATENT DOCUMENTS

JP  2002-235564 A  8/2002

\* cited by examiner

*Primary Examiner*—Michael Leslie
(74) *Attorney, Agent, or Firm*—Frishauf, Holtz, Goodman & Chick, P.C.

(57) ABSTRACT

A hydrostatic transmission vehicle comprises: a fuel adjustment position detection portion (681) which detects an operation position of a fuel adjustment portion (68); a deceleration operation position detection portion (691) which detects an operation quantity of a deceleration operation portion (69); and a controller (9) which controls a displacement of a hydrostatic transmission (7), and the controller (9) comprises: an operation state judgment portion (91) which judges operation states of the fuel adjustment portion (68) and the deceleration operation portion (69) based on detection values acquired by the fuel adjustment position detection portion (681) and the deceleration operation position detection portion (691); and a displacement control command generation portion (94) which generates a displacement control command which differs depending on a case where an engine revolution number is restricted by the fuel adjustment portion (68) and a case where an engine revolution number is restricted by the deceleration operation portion (69).

4 Claims, 7 Drawing Sheets

HYDROSTATIC TRANSMISSION VEHICLE AND HYDROSTATIC TRANSMISSION CONTROLLER

BACKGROUND OF THE INVENTION

1. Field of the Invention

The Present invention relates to a hydrostatic transmission vehicle and a hydrostatic transmission controller.

2. Description of Related Art

There has been conventionally a hydrostatic transmission vehicle which converts an output from an engine by a hydrostatic transmission and travels. The hydrostatic transmission comprises a variable displacement pump driven by an engine, and a variable displacement hydraulic motor which revolves upon receiving a pressure oil from the variable displacement pump. Further, by varying a cam plate angle of the variable displacement pump or the variable displacement hydraulic motor, a displacement of the hydraulic variable transmission can be changed, an engine output which can be absorbed by the hydrostatic transmission can be changed or a vehicle speed of a working vehicle can be changed.

Furthermore, the above-described hydrostatic transmission vehicle include construction machines, and the construction machines includes a vehicle which has a decelerator pedal like a bulldozer so that a vehicle speed can be temporarily reduced by decreasing an engine revolving number by pushing down the decelerator pedal during traveling.

FIG. 7 shows a system configuration of such a conventional vehicle. A fuel injection pump 101 of an engine 100 has a non-illustrated governor lever which adjusts a fuel injection quantity.

This governor lever is connected with a fuel adjustment lever 102 and a decelerator pedal 103 through a push-pull cable and a link mechanism.

An operator of a vehicle can set a revolution number of the engine 100 to a desired revolution number by operating the fuel adjustment lever 102. Moreover, the engine revolution number can be further reduced from the revolution number set by the fuel adjustment lever 102 by stepping on the decelerator pedal 103 so that a vehicle speed can be temporarily decreased. It is to be noted that the decelerator pedal 103 swivels together with the fuel adjustment lever 102 by moving the fuel adjustment lever 102, but a position of the fuel adjustment lever 102 remains unchanged even if the decelerator pedal 103 is pushed down (see, e.g., Japanese Patent Application Laid-open No. 2002-235564).

A potentiometer 104 is provided to the decelerator pedal 103 so that a signal indicative of a position (a swiveling quantity) of the decelerator pedal 103 is transmitted to a controller 105, and an engine revolution sensor 106 is provided to the engine 100 so that a signal indicative of an engine revolution number can be also transmitted to the controller 105.

The controller 105 controls a displacement of a hydrostatic transmission 107 based on signals from the potentiometer 104 and the engine revolution sensor 106.

Here, controlling a displacement of the hydrostatic transmission 107 specifically means controlling a cam plate angle of a variable displacement pump or a variable displacement motor of the hydrostatic transmission 107. That is, changing a displacement of the hydrostatic transmission 107 means varying a torque which can be absorbed by the hydrostatic transmission 107 in torques generated by the engine, and also means varying a ratio of an output revolution number of the hydrostatic transmission 107 to an engine revolution number (i.e., a reduction ratio).

FIG. 8 is a view showing an example of a displacement control of the hydrostatic transmission in the conventional system depicted in FIG. 7.

In FIG. 8, a heavy broken line ET is an engine torque curve representing a relationship between a revolution number of the engine 5 and a torque. Additionally, a heavy solid line HT is an absorption torque curve representing characteristics of a torque which can be absorbed by the hydrostatic transmission 107 in a state where the fuel adjustment lever 102 is set at a maximum position and the decelerator pedal 103 is not pushed down, i.e., the governor lever is moved to a maximum position by the push-pull cable and the engine 100 can revolve at a maximum revolution number (this state will be referred to as a "high-idle" state hereinafter).

More specifically, the absorption torque curve HT is a curve which indicates characteristics representing how a torque with is absorbed by the hydrostatic transmission 107 is varied with respect to an actual change in revolution number of the engine 100 (a horizontal axis in FIG. 8) detected by the engine revolution sensor 106.

As shown in FIG. 8, in the high-idle state, the engine torque curve ET and the absorption torque curve HT are set to cross each other in a revolution number region which is slightly lower than a rated point P0. That is, all of torques generated by the engine 100 are absorbed by the hydrostatic transmission 107 in the vicinity of an engine rated revolution number NH. Further, when a traveling resistance load is increased and an engine revolution number is lowered, a torque to be absorbed by the hydrostatic transmission 107 is rapidly reduced so that an engine stall can be prevented.

With such characteristics, a vehicle can travel by fully using the torque generated by the engine 100 while maintaining a revolution number of the engine 100 in the vicinity of the rated revolution number NH. That is, in the example of a bulldozer mentioned above, a dirt conveying operation can be vigorously and rapidly performed by effectively using an engine output.

When a bulldozer as an example of such a working vehicle performs a dirt conveying operation of pushing dirt as an earthwork, an operator sets a revolution number of the engine 100 to a high idle by operating the fuel adjustment lever 102. As shown in FIG. 8, the engine 100 revolves at the rated revolution number NH and operated at the rated point P0 where a rated torque T0 is generated.

The controller 105 controls the hydrostatic transmission 107 in such a manner that an absorbable torque is set to TK0 which is a value exceeding a torque generated by the engine so that the rated torque T0 can be absorbed. Specifically, a displacement of the variable displacement pump is set to a maximum displacement Q0.

When a load of the dirt with respect to the bulldozer is increased and the revolution number of the engine 100 becomes lower than the high-idle revolution number NH, a revolution number signal of the engine revolution sensor 106 is lowered. Therefore, the controller 105 performs a control of lowering a displacement of the variable displacement pump in accordance with a reduction in the engine revolution number a indicated by a line C in FIG. 8, thereby avoiding an engine stall of the engine 100.

The controller 105 carries out a control of reducing a displacement of the hydrostatic transmission 107 when an engine revolution number becomes lower than the rated revolution number NH in this manner. When a displacement is reduced, a load is decreased and an engine revolution number is increased. Therefore, the hydrostatic transmission 107 eventually maintains a maximum displacement which does not exceed a torque generated by the engine.

Since the engine revolution number is further increased when the load is reduced due to, e.g., an operation of a moldboard by an operator, the controller 105 returns the displacement of the variable displacement pump to the original maximum displacement Q0. Therefore, the bulldozer can always effectively use an output from the engine 100 for the operation.

In case of reducing a speed of the bulldozer, the decelerator pedal 103 is pushed down. Then, the governor lever moves in accordance with a pushing quantity of the decelerator pedal 103, and the revolution number of the engine 100 is reduced. For example, the revolution number is reduced from the rated revolution number NH shown in FIG. 8 to a decelerator revolution number ND.

In this case, since a vehicle speed is not reduced when a displacement of the hydrostatic transmission 107 is left as it is, the controller 105 determines the displacement of the variable displacement pump as a predetermined displacement QD and reduces an absorbable torque to TKD in response to a signal from the potentiometer 104 in order to reduce a vehicle speed.

Again explaining this with reference to FIG. 8, when the decelerator pedal 103 is pushed down in order to temporarily reduce a speed of the vehicle, the governor lever moves in accordance with a pedal pushing quantity, and a fuel injection quantity is restricted. Therefore, the engine revolution number is reduced, and the engine torque curve apparently varies as ET1, ET2 . . . .

Furthermore, at this moment, the controller 105 executes a control of changing the absorption torque curve of the hydrostatic transmission 107 as HT1, HT2 . . . based on a pushing quantity of the decelerator pedal 103 obtained by the potentiometer 104.

As shown in FIG. 8, it is determined that a displacement control pattern of the hydrostatic transmission 107 when the decelerator pedal 103 is pushed down has characteristics of reducing the absorption torque generated by the hydrostatic transmission 107 as a pushing quantity of the decelerator pedal 103 is increased. Therefore, a vehicle speed can be reduced in accordance with a pushing quantity of the decelerator pedal 103.

Meanwhile, in a vehicle such at a construction chine as typified by the above-described bulldozer, a demand for a reduction in noise a working state and a reduction in fuel consumption is increased, and it is often the case that a work is carried out by narrowing down a revolution number of the engine 100 by a manipulation of the fuel adjustment lever 102 in order to effect a partial operation. For example, a work is carried out by reducing a revolution number of the engine 100 to a partial revolution number NP shown in FIG. 8. The engine 100 can generate a partial torque TP with the partial revolution number NP.

When the fuel adjustment lever 102 is operated, however, the decelerator pedal 103 is also moved. Therefore, the controller 105 performs a displacement control (see FIG. 8) of reducing a torque which is absorbed by the hydrostatic transmission 107 based on a detection valve obtained by the potentiometer 104. That is, since a target revolution number of the engine 100 based on a detection value obtained from the potentiometer 104 due to the partial operation is reduced to NP, the controller 105 executes a control by which the absorption torque curve is changed to HT2 so that a displacement of the hydrostatic transmission 107 is reduced. As a result, the absorbable torque of the hydrostatic transmission 107 is reduced to TKP, and hence all of the output torque TP of the engine 100 cannot be absorbed.

A fact that the absorption torque generated by the hydrostatic transmission 107 becomes lower than the torque generated by the engine means that a just small quantity of torque is transmitted to a traveling device irrespective of a fact that the engine torque still has a margin. That is, in the partial operation in this state, engine performances cannot be fully exploited, and the working efficiency is lowered.

SUMMARY OF THE INVENTION

An object of the present invention to provide a hydrostatic transmission vehicle ad a controller for a control over the hydrostatic transmission which can effectively exploit an output from at engine even in a partial operation and the following configuration is adopted.

According to the first invention, there is provided a hydrostatic transmission vehicle which includes a fuel adjustment portion which restricts an engine revolution number and a deceleration operation portion which reduces a vehicle speed by decreasing an engine revolution number, and travels by converting an output from the engine through a hydrostatic transmission, comprising:

a fuel adjustment position detection portion which detects an operation position of the fuel adjustment portion;

a deceleration operation position detection portion which detects an operation quantity of the deceleration operation portion; and a controller which controls a displacement of the hydrostatic transmission, wherein the controller comprises:

an operation state judgment portion which judges operation states of the fuel adjustment portion and the deceleration operation portion based on detection values obtained from the fuel adjustment position detection portion and the deceleration operation position detection portion; and a displacement control command generation portion which generates a displacement control command which differs depending on a case where the operation state judgment portion determines that an engine revolution number is restricted by the fuel adjustment portion and a case where the sate determines that an engine revolution number is restricted by the deceleration operation portion.

According to the hydrostatic transmission vehicle of the second invention, in the first invention, the controller comprises a displacement control pattern storage portion which stores therein a first displacement control pattern with which a displacement of the hydrostatic transmission is controlled so that all of a torque generated by the engine is absorbed by the hydrostatic transmission and a second displacement control pattern with which a displacement of the hydrostatic transmission is controlled so that a torque absorbed by the hydrostatic transmission becomes not more than a torque generated by the engine, and the displacement control portion performs a displacement control based on the first displacement control pattern when the operation state judgment portion determines that an engine revolution number is restricted by the fuel adjustment portion, and a displacement control based on the second displacement control pattern when the operation state judgment portion determines that an engine revolution number is restricted by the deceleration operation portion.

According to the hydrostatic transmission vehicle of the third invention, in the first invention or the second invention, the operation state judgment portion compares a target revolution number of the engine obtained from a detection value acquired by the fuel adjustment position detection portion with a target revolution number of the engine obtained from a detection value acquired by the deceleration operation position detection portion, and determines an operation by either portion with a lower target revolution number when the both revolution numbers are different from each other.

According to a controller for controlling a displacement of a hydrostatic transmission of the fourth to sixth inventions, each invention concerning the above-described hydrostatic transmission vehicle is configured as a controller for controlling a displacement of a hydrostatic transmission.

According to the present invention mentioned above, since a displacement control pattern of the hydrostatic transmission differs depending on a case where an engine revolution number is restricted by the fuel adjustment portion and a case where an engine revolution number is restricted by the deceleration operation portion, the engine performances can be effectively exploited even if the engine is subjected to the partial operation by manipulating the fuel adjustment lever.

Moreover, since a displacement control pattern of the hydrostatic transmission when an engine revolution number is restricted by the fuel adjustment portion is such a pattern as that all of a torque generated by the engine is absorbed by the hydrostatic transmission the performances can be fully exploited in a state where the engine is subjected to the partial operation by manipulating the fuel adjustment lever.

DETAILED DESCRIPTION OF PREFERRED EMBODIMENT(S)

An embodiment of a vehicle loaded with a continuously variable transmission according to the present invention will now be described hereinafter with reference to the accompanying drawings.

[1] Entire Structure

Figure 1:
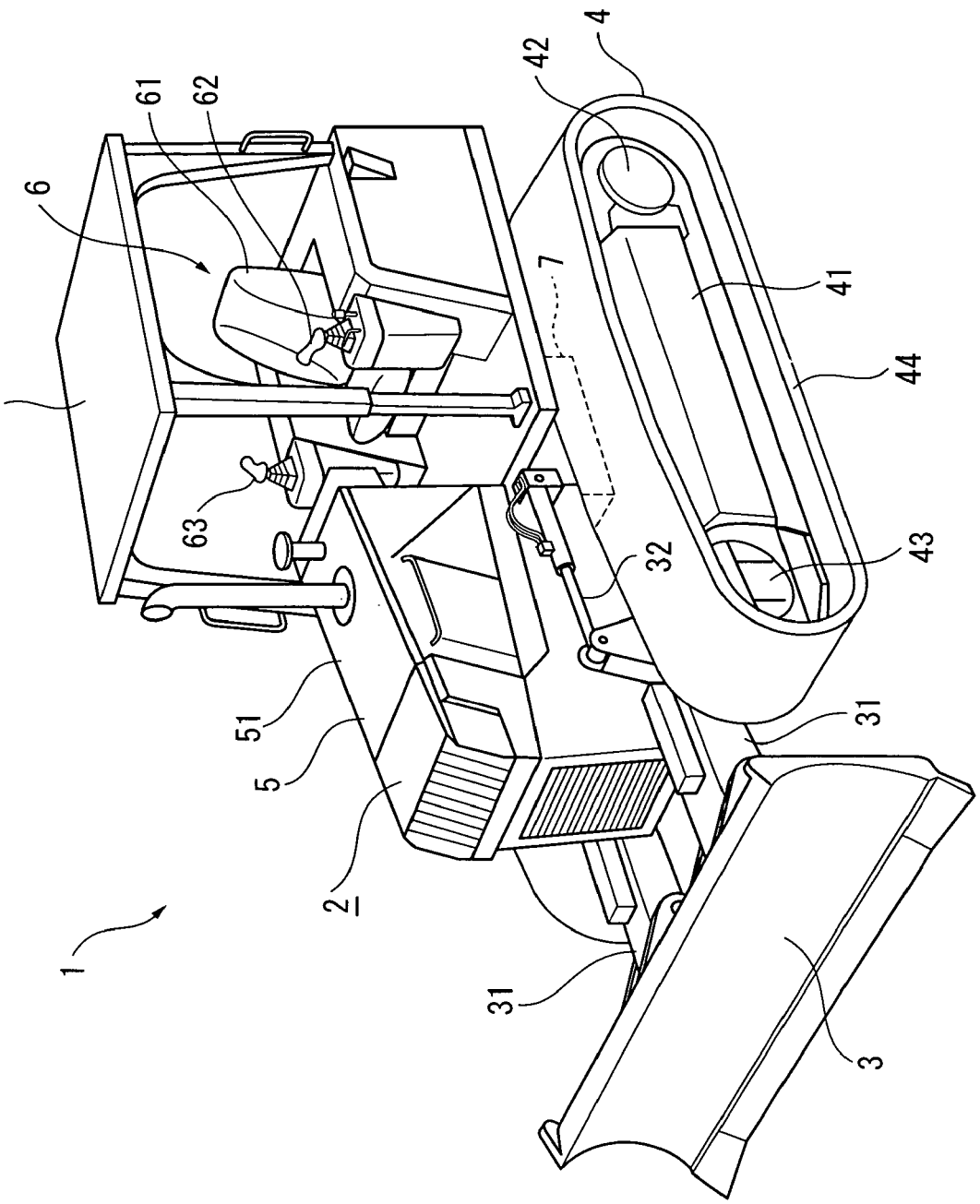
FIG. 1 an external view of a bulldozer according to a first embodiment of the present invention.

FIG. 1 shows a bulldozer 1 according to an embodiment of the present invention. This bulldozer 1 comprises a vehicle main body 2, a moldboard 3, and each crawler device 4.

The moldboard 3 is a part which is arranged at a front end portion of the bulldozer 1 and performs banking and bulldozing. This moldboard 3 is connected with the vehicle main body 2 through a frame 31, and moves up and down by expansion and contraction of cylinders 32.

The crawler device 4 is a part which is arranged on each of both sides of a lower portion of the vehicle main body 2, functions as a traveling device, and comprises a truck frame 41, a drive wheel 42, in idle 43 and a crawler 44.

The truck frame 41 is configured as a steel body which extends along the vehicle main body 2, and pivotally supported so as to be capable of oscillating with respect to a pivot shaft which protrudes from a main frame of the vehicle main body 2.

The drive wheel 42 is a part which is driven by a hydraulic motor as a later-described drive source and configured in a form of a sprocket, and the crawler 44 is wound in a state where it is meshed at the sprocket part.

The idler 43 is a wheel at the other end around which the crawler 44 is wound. When the crawler 44 moves by driving of the drive wheel 42, the idler 43 also rotate with movement of this crawler 44. It is to be noted that, although not shown in FIG. 1, a plurality of lower rotating wheels ate arranged at the lower portion of the truck frame 41, these lower rotating wheels support a load received by the crawler 44 from the ground and also function as guide rollers when at the time of driving of the drive wheel 42.

The vehicle main body 2 is mounted on the non-illustrated main frame, and comprises an engine 5 arranged on the front side in a traveling direction and a steering chamber 6 arranged on the rear side in the traveling direction. The engine 5 comprises an engine main body accommodated in an engine hood 51, and is a power source which drives an HST pump which constitutes an HST device 7 arranged at the lower portion of the vehicle main body 2.

The steering chamber 6 is a part where an operator is get in and steers the bulldozer 1 and comprises a driver seat 61 and operation levers 62 and 63, and an upper portion of the steering chamber 6 is covered with a canopy 8.

Figure 2:
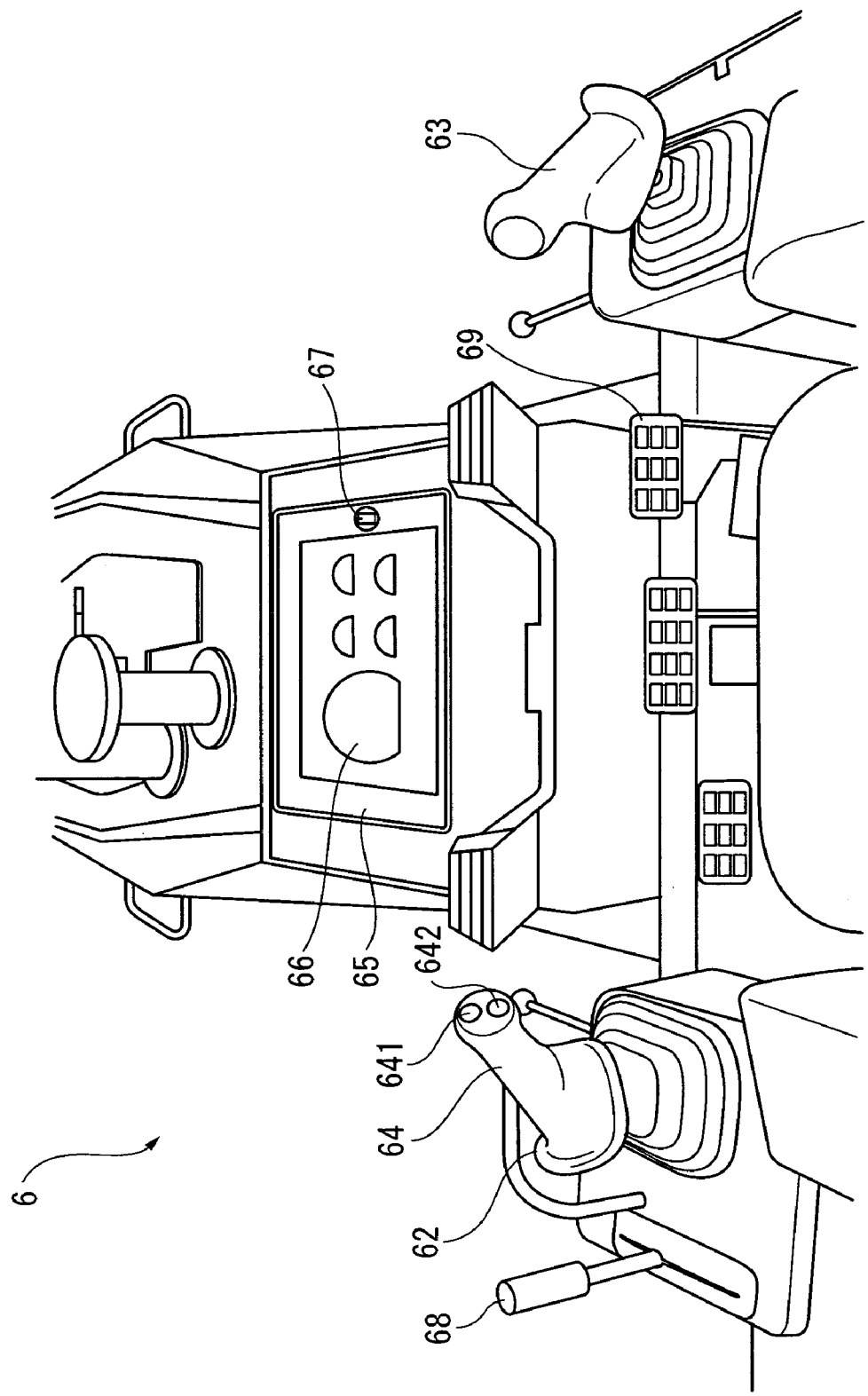
FIG. 2 is a view showing a driver seat and its periphery of the bulldozer in the first embodiment.

As shown in FIG. 2, in this steering chamber 6, a traveling lever 62 is arranged on the left side of the driver seat 61, and a moldboard operation lever 63 which is used to operate the moldboard 3 is arranged on the right side of the same. A shift-up switch 641 and a shift-down switch 642 are arranged at an upper portion of a grip 64 of the traveling lever 62.

The traveling lever 62 is configured as a lever like a joystick. When this traveling lever 62 is operated, an operation signal is output to a later-described controller 9, and the controller 9 generates a control signal based on the output signal and operates each part of the HST device 7, thereby moving the bulldozer 1. Specifically, it outputs an operation signal which moves the bulldozer forward when the traveling lever 62 is inclined frontward, moves the same backward when this lever is inclined rearward, moves the same to the left side when this lever is inclined in the left direction, and moves the same to the right side when this lever is inclined in the right direction.

A monitor panel 65 on which gauges or switches are arranged is provided on the front side of the driver seat 61. A velocity stage display portion 66 is provided on the left side close to the center of the monitor panel 65, and a shift mode changeover switch 67 is provided on the right side.

Additionally, a fuel adjustment lever 68 as a fuel adjustment portion is provided on the left side of the traveling lever 62. When this fuel adjustment lever 68 is operated, a revolution number of the engine 5 can be adjusted.

Further, a decelerator pedal 69 as a deceleration operation portion is provided at the right lower portion of the driver seat 61. A revolution number of the engine 5 is reduced when this decelerator pedal 69 is pushed down. It is to be noted that a control according to operations of the fuel adjustment lever 68 and the decelerator pedal 69 will be described later.

[2] Structure of HST Device 7

A structure of the HST device 7 will now be described with reference to FIG. 3.

The HST device 7 as a hydrostatic transmission comprises, an HST pump 71, two traveling drive portions 72 provided in accordance with right and left traveling devices of the crawler device 4, a switching operation portion 73 including four consecutive solenoid valves, and a hydraulic fluid tank 74. This HST device 7 is controlled by the controller 9.

(2-1) Structure of HST Pump 71

The HST pump 71 comprises two variable displacement pumps 711, pump actuators 712, pump servo valves 713, and EPC valves 714. Each variable displacement pump 711 as well as a corresponding traveling drive portion 72 constitutes a closed circuit, and supplies a pressure oil to each traveling drive portion 72.

A displacement of the variable displacement pump 711 can be changed by continuously varying an inclination angle of a cam plate, and a traveling speed of the bulldozer 1 can be increased by increasing a displacement quantity of the variable displacement pump 711.

The pump actuator 712 is a part which controls a displacement quantity of the variable displacement pump 711. Specifically, when an inclination angle of the cam plate is changed by coupling a servo piston which is driven by a hydraulic pressure is coupled with a cam plate end portion of the variable displacement pump 711 and supplying a pressure oil from a pilot line to the pump actuator 712, a displacement quantity is changed.

The pump servo valve 713 is a part which is configured as a four-port three-position valve and controls a quantity of an oil to be fed to the pump actuator 712. This valve adjusts a quantity of hydraulic fluid supplied through the pilot line and supplies it to the pump actuator 712 by switching a position.

The two EPC valves 714 are provided with respect to a pump servo valve 713 and electrically connected with a controller 9.

The EPC valve 714 outputs to the pump servo valve 713 a signal pressure according to an intensity of a displacement control command current which is input from the controller 9, and moves a spool of the pump servo valve 713. The pump servo valve 713 moves the pump actuator 712 by an amount which is equal to a movement distance of the spool, and a cam plate angle of the variable displacement pump 717 is thereby changed.

(2-2) Structure of Traveling Drive Portion 72

The traveling drive portion 72 is provided in accordance with each of the right and left crawler devices 4. Each traveling drive portion 72 comprises a clutch 721, a variable displacement motor 722, a first actuator 723, a second actuator 724, a shuttle valve 725, a relief valve 726, a transmission switching valve 727.

The clutch 721 is interposed and arranged between a rotary shaft of the variable displacement motor 722 and a drive shaft 421 of the drive wheel 42 of the crawler device 4. This clutch 721 is provided in order to transmit a turning force of the variable displacement motor 722 to the drive shaft 421, and can couple the rotary shaft of the variable displacement motor 722 with the drive shaft 421 or release the coupling.

In the variable displacement motor 722, the rotary shaft as an output shaft is coupled with the clutch 721, an oil pressure supply source is connected with the variable displacement pump 71 through a piping line A0. The variable displacement motor 722 is driven by a pressure oil from this variable displacement pump 711 and functions as a drive source of the drive wheel 42 of the crawler device 4. This variable displacement motor 722 can change a revolving speed, a torque and the like output from the rotary shaft by varying an inclination angle of the cam plate on three stages.

The first actuator 723 and the second actuator 724 control an output from the variable displacement motor 722. An output shaft of the first actuator 723 is coupled with cam plate end portion of the variable displacement motor 722. An output shaft of the second actuator 724 is in contact with a protruding portion of the output shaft of the first actuator 723 in order to restrict a retiring quantity of the output shaft of the first actuator 723.

A cam plate angle of the variable displacement motor 722 becomes maximum in a state where the output shaft of the first actuator 723 protrudes at the maximum level, and the cam plate angle of the variable displacement motor 722 becomes a minimum angle in a state where the output shaft of the first actuator 723 retires at the maximum level. In a state where the output shaft of the second actuator 724 protrudes, a retiring quantity of the output shaft of the first actuator 723 is restricted, and the cam plate angle of the variable displacement motor 722 becomes an intermediate angle in this state.

A shuttle valve 725 diverges from a middle portion of the piping line A0 of the variable displacement pump 711 and the variable displacement motor 722, is provided at a middle portion of a piping line A1 which is disposed so as to sandwich an upstream side and a downstream side of the variable displacement motor 722, and supplies a pressure oil to the first actuator 723 and the second actuator 724. This shuttle valve 725 is a five-port three-position valve, and has two pots on the input side being connected with the upstream side and the downstream side of the variable displacement motor 722, two ports out of three ports on the output side being connected with the input side of the transmission switching valve 727, and one port being connected with a drain pipe through the relief valve 726.

Further, the shuttle valve 725 is configured to change a position by its own pressure. When the pressure oils on both the upstream side and the downstream side of the variable displacement motor 722 are balanced, both inputs are shut off from the drain pipe at a central position. On the other hand, when the balances on the upstream side and the downstream side vary, the shuttle valve 725 changes its position by utilizing pressures on the upstream side and the downstream side, outputs a flow with a high pressure to the transmission switching valve 727, and discharges a flow with a low pressure to the drain pipe through the relief valve 726.

The transmission switching valve 727 is a five-port three-position valve which switches its position in accordance with a transmission control signal from the later-described controller 9. One of the two ports of the transmission switching valve 727 on the input side is connected with the output side of the shuttle valve 725 whilst the other port is connected with the drain pipe. One of the three ports on the output side is connected with an input/output port which moves a piston of the second actuator 724 in an advancing direction of the output shaft, and the remaining two ports are connected with an input/output port which moves a piston of the first actuator 723 in advancing/retiring directions.

It is to be noted that the port which roves the output shaft of the first actuator 723 in the retiring direction communicates with the port which moves the output shaft of the second actuator 724 in the retiring direction.

A flow quantity adjustment valve 728 is provided in this transmission switching valve 727, and an operation time of each of the first actuator 723 and dew second actuator 724, i.e., a cam plate angle switching time of the variable displacement motor 722 is adjusted by the flow quantity adjustment valve 728.

Furthermore, three positions MIN, MID and MAX are set to the transmission switching valve 727, and the transmission switching valve 727 is set at a central position MAX when a transmission control signal is not input from the controller 9. Specifically, the following pressure oil supply states are set at the respective positions.

First, a position MAX is a setting by which the input pressure oil is supplied to all the ports of the first actuator 723 and the second actuator 724. At this position, the both output shafts of the respective actuators 723 and 724 protrude due to a difference in pressure receiving area of the pistons in the respective actuators 723 and 724, and the cam plate angle of the variable displacement motor 722 becomes the maximum angle.

A position MID is a setting by which the port in the advancing direction of the output shaft of the first actuator 723 is connected with the drain pipe and the pressure oil is supplied to the other ports. At this position, the output shaft of the second actuator 724 protrudes, the output shaft of the first actuator 723 retires up to the intermediate position, and the cam plate angle of the variable displacement motor 722 becomes an intermediate angle.

A position MIN is a setting by which the port in the advancing direction of the output shaft of the first actuator 723 and the port in the advancing direction of the output shaft of the second actuator 724 are connected with the drain pipe and the input pressure oil is supplied to the remaining ports. At this position, the both output shafts of the respective actuators 723 and 724 retire, and the cam plate angle of the variable displacement motor 722 becomes the minimum angle.

(2-3) Structure of Switching Operation Portion 73

The switching operation portion 73 is a part which comprises a fixed displacement pump 73A and four solenoid valves 731, 732, 733 and 734, and switches the valves constituting the traveling drive portion 72.

Figure 3:
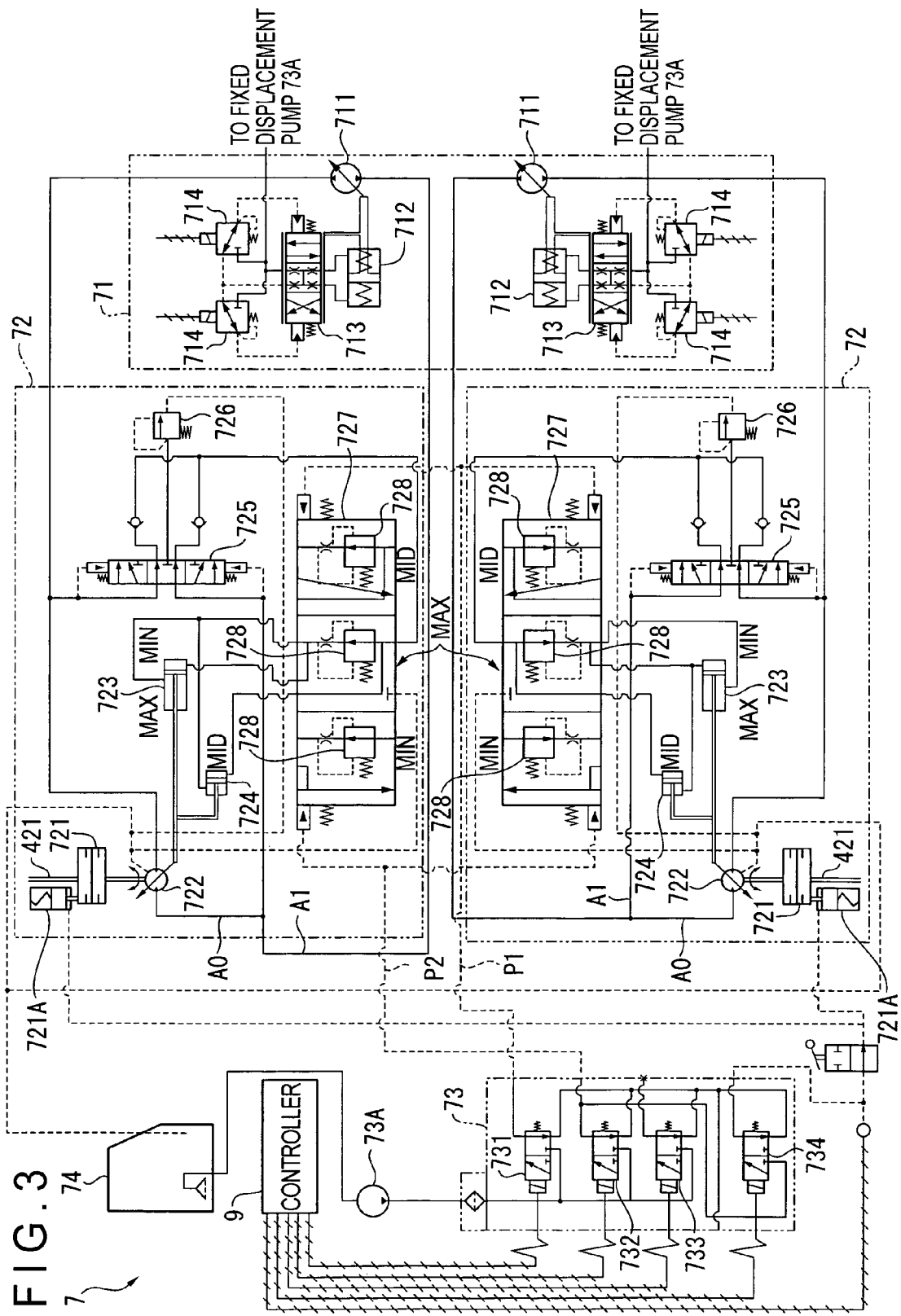
FIG. 3 is a scheme showing a sure of an HST device of the bulldozer in the first embodiment.

The fixed displacement pump 73A is a pump which generates a pilot pressure of a pilot line indicated by a broken-line in FIG. 3, and supplies a hydraulic fluid in the hydraulic fluid tank 74 as a pressure oil to the pilot line.

The solenoid valve 731 is a part which performs switching to the intermediate angle of the cam plate of the variable displacement motor 722 based on a transmission control signal from the controller 9. When a solenoid provided to the solenoid valve 731 is excited, a pilot pressure is supplied to the transmission switching valve 727 through a pilot line P1, and a position of the transmission switching valve 727 is switched to the position MID.

The solenoid valve 732 is a part which performs switching to the minimum angle of the cam plate of the variable displacement motor 722 based on a transmission control signal from the controller 9. When a solenoid provided to the solenoid valve 732 is excited, a pilot pressure is supplied to the transmission switching valve 727 through a pilot line P2, and a position of this transmission switching valve 727 is switched to the position MIN.

Although not shown, the solenoid valve 733 is a part which supplies a pilot pressure to a mechanism for slow braking. The solenoid valve 734 supplies a pilot pressure to a parking brake, drives an actuator 721A provided to the clutch 721 by utilizing a pilot pressure, and releases coupling of the clutch 721.

[3] Control Structure Based on Controller 9

A drive control structure of the engine 5 and the HST device 7 based on the controller 9 will now be described with reference to FIG. 4.

Figure 4:
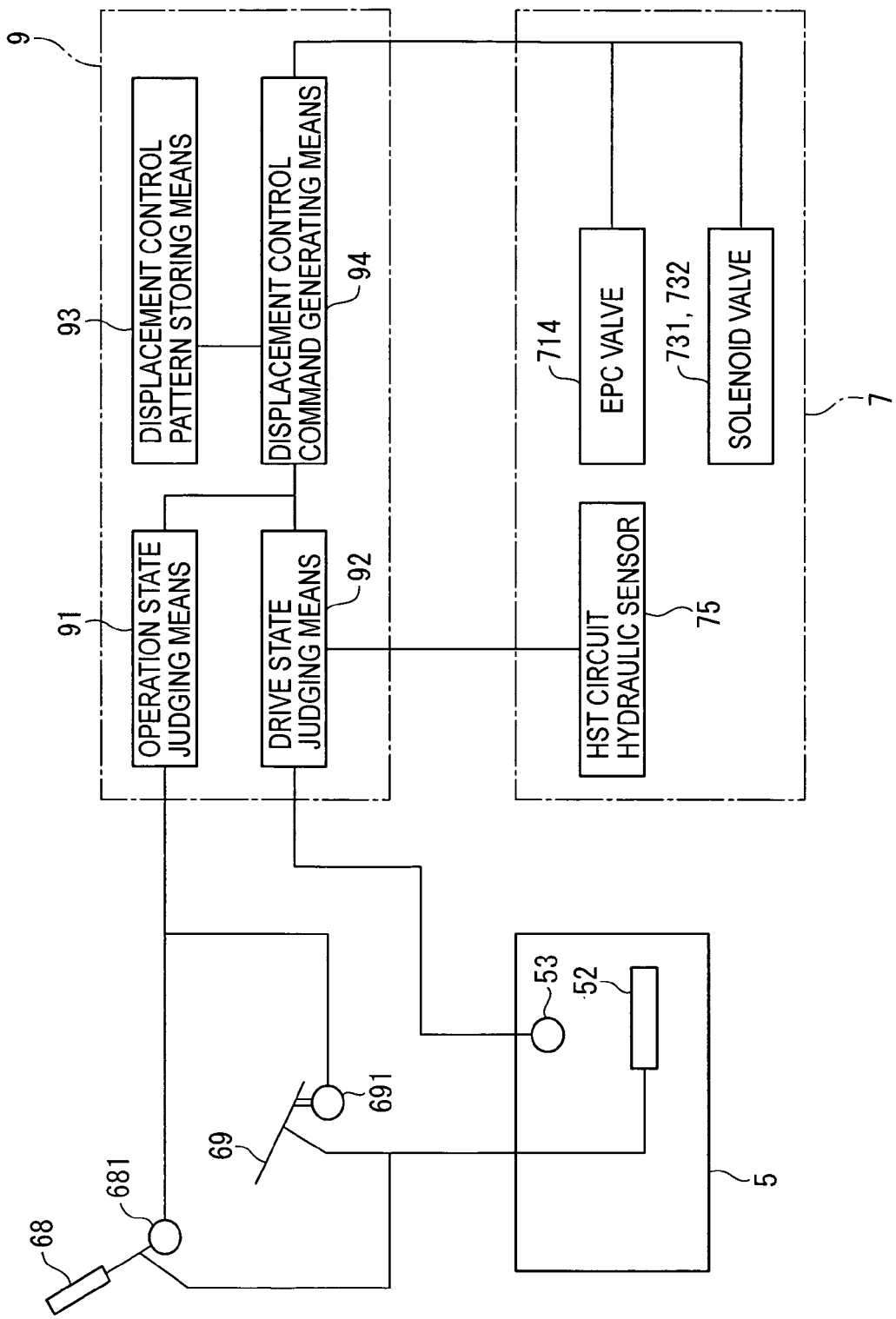
FIG. 4 is a scheme showing a structure of a controller in the first embodiment.

As shown in FIG. 4, a fuel injection pump 52 of the engine 5 has a non-illustrated governor lever which is used to adjust a fuel injection quantity. This governor lever is connected with the fuel adjustment lever 68 and the decelerator pedal 69 through the push-pull cable and the link mechanism;

Furthermore, when the fuel adjustment lever 68 is operated, a fuel injection quantity from the fuel injection pump varies, a revolution number of the engine 5 fluctuates. Even if the decelerator pedal 69 is operated, a fuel injection quantity from the fuel injection pump 52 varies, and a revolution number of the engine 5 changes.

Moreover, when an operator sit on the driver seat 61 steps on the decelerator pedal 69, a revolution number of the engine 5 can be further reduced from a revolution number set by the fuel adjustment lever 68, thereby temporarily decelerating the vehicle. It is to be noted that, in this example, as in the prior art, there is adopted a structure in which the decelerator pedal 69 also swivels by moving the fuel adjustment lever 68, but a position of the fuel adjustment lever 68 is not changed even if the decelerator pedal 69 is pushed down.

The controller 9 is confided as a control portion which performs a drive control over the HST device 7 based on an engine revolution number of the engine 5, and an engine revolution sensor 53, a potentiometer 681, a potentiometer 691 and an HST circuit hydraulic sensor 75 are electrically connected to the input side of the controller 9.

The engine revolution sensor 53 has a function which detects a revolution number of the engine 5, converts it into an electrical signal and outputs a converted signal to the controller 9.

The potentiometer 681 has a function as a fuel adjustment position detection portion which detects a fuel adjustment position obtained by an operation of the adjustment lever 68. When a operator manipulates the fuel adjustment lever 68, the potentiometer 681 outputs an electrical signal according to this manipulation quantity to the controller 9.

The potentiometer 691 functions as a deceleration operation position detection portion which detects a deceleration operation position obtained by an operation of the decelerator pedal 69. When an operator pushes down the decelerator pedal 69, the potentiometer 691 outputs an electrical signal according to this pushing quantity to the controller 9.

The HST circuit hydraulic sensor 75 is provided to each of the right and left traveling drive portions 72, and this is a sensor which detects a pressure in a hydraulic circuit of each traveling drive portion 72 and feeds it back to the controller 9.

Additionally, an EPC valve 714 and solenoid valves 731 and 732 constituting the HST device 7 are electrically connected to the output side of the controller 9, and these valves are controlled to be opened/closed by outputting an electrical signal to the valves. The cam plate angle of each of the variable displacement pump 711 and the variable displacement motor 722 constituting the HST device 7 can be changed by performing the opening/closing control over these valves, thereby realizing a displacement control of the HST device 7.

The controller 9 is a part which outputs a control command to the EPC valve 714 and the solenoid valves 731 and 732 constituting the HST device 7 based on detection signals output from the potentiometers 681 and 691, the engine revolution sensor 53 and the HST circuit hydraulic sensor 75, and comprises an operation state judgment portion 91, a drive state judgment portion 92, a displacement control pattern storage portion 93 and a displacement control command generation portion 94.

The operation state judgment portion 91 acquires a target revolution number according to an adjustment position of the fuel adjustment lever 68 based on a detection value of the potentiometer 681, compares the acquired revolution number with a target revolution number according to a pushing quantity of the decelerator pedal 69 based on a detection value of the potentiometer 691, and determines an operation state concerning a lower target revolution number. That is, when the target revolution number set by pushing down the decelerator pedal 69 is lower than the target revolution number set by operating the fuel adjustment lever 68, the operation state judgment portion 91 determines that the deceleration operation using the decelerator pedal 69 is performed. It is to be noted that, although described above, the decelerator pedal 69 also swivels when the fuel adjustment lever 68 is operated, and hence this embodiment does not predetermine that the target revolution number based on the decelerator pedal 69 exceeds the target revolution number set by the fuel adjustment lever 68.

The drive state judgment portion 92 is a part which monitors a driving state of the engine 5 and an operation state of the SST device 7 based on detection values from the engine revolution sensor 53 of the engine 5 and the HST circuit hydraulic sensor 75. This portion monitors a reduction in revolution number of the engine 5 involved by an external load or a change in oil pressure of the HST device 7, and outputs this state to the later-described displacement control command generation portion 94.

The displacement control pattern storage portion 93 is configured as a storage device such as a memory which stores a plurality of displacement control patterns of the variable displacement pump 711 and/or the variable displacement motor 722 constituting the HST device 7.

Specifically, this displacement control pattern storage portion 93 stores such a first displacement control pattern as that absorption torque curves HT1, HT2, HT3 and HT4 are obtained with an absorbable torque obtained by the HST device 7 being determined as a maximum torque TK0 in accordance with an operation quantity of the fuel adjustment lever 68 and such a second displacement control pattern as that absorption torque curve, HT1A, HT2A, HT3A . . . are obtained with the absorbable torque varying in accordance with a pushing quantity of the decelerator pedal 69.

The displacement control command generation portion 94 selects a displacement control pattern stored in the displacement control pattern storage portion 93 based on a result obtained from a judgment by the operation state judgment portion 91 and driving states of the engine 5 and the HST device 7 judged by the drive state judgment portion 92, generates a displacement control command HST device 7, outputs a control command to the EPC valve 714 constituting the HST device 7, and outputs control commands to the solenoid valves 731 and 732 according to needs. The EPC valve 714 drives the pump actuator 712 based on a displacement control command issued from the displacement control command generation portion 94, changes the cam plate angle of the variable displacement pump 711, and varies a displacement of the variable displacement pump 711.

[4] Effect by Controller 9

Figure 6:
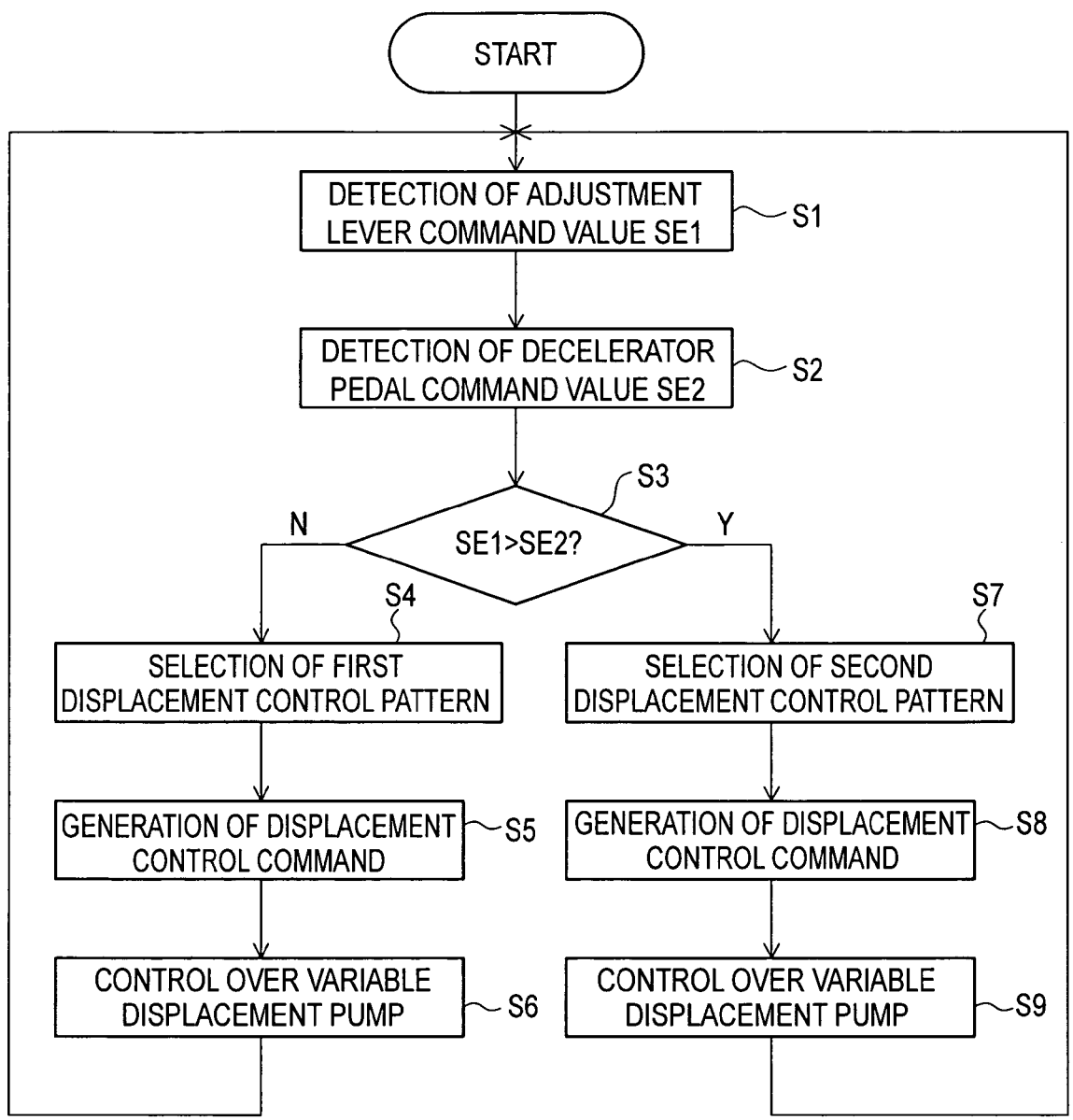
FIG. 6 is a flowchart illustrating an effect of the first embodiment.
Figure 7:
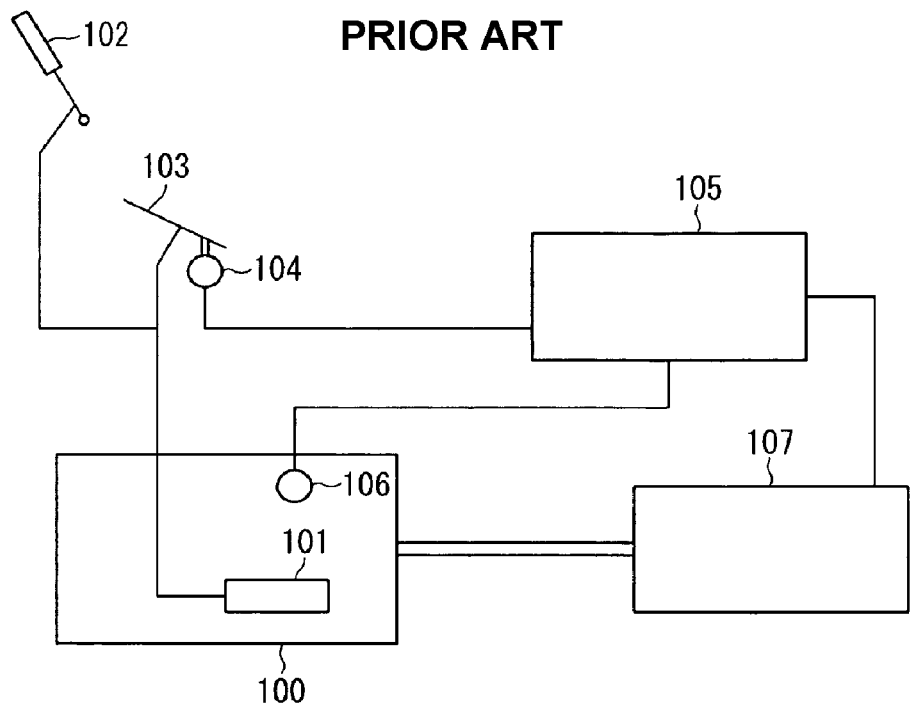
FIG. 7 is a scheme showing a conventional system configuration of a vehicle.
Figure 8:
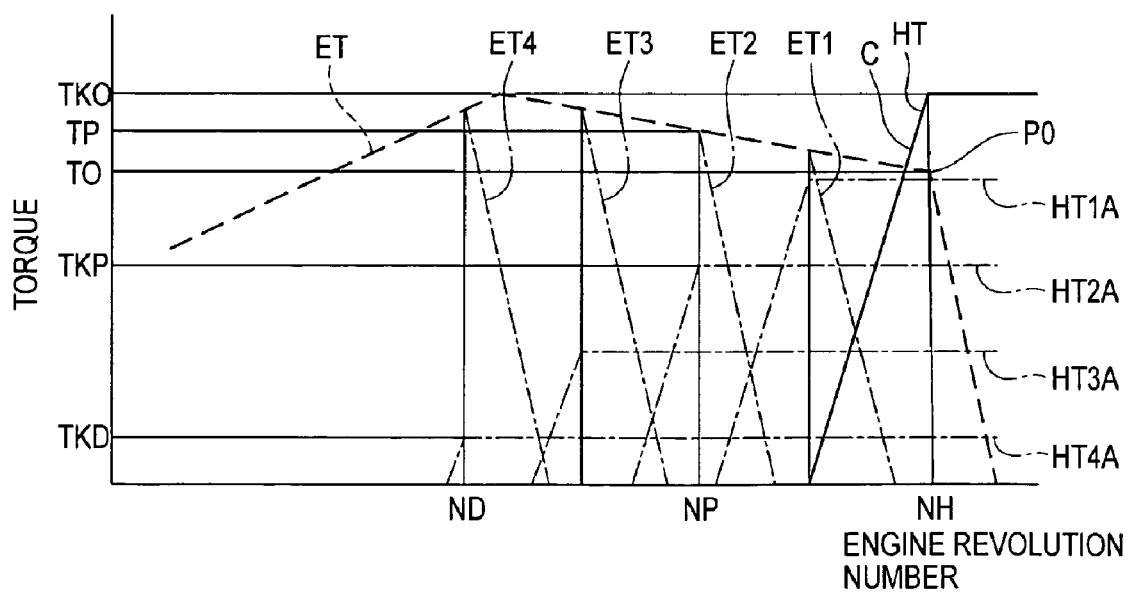
FIG. 8 is a view showing an example of a displacement control of a hydrostatic transmission in a conventional system.

An effect of the above-described controller 9 will now be described with reference to a flowchart shown in FIG. 6.

(1) The operation state judgment portion 91 detects a command value SE1 obtained by the fuel adjustment lever 68 through the potentiometer 681 during driving the bulldozer 1 (processing S1). Further, the operation state judgment portion 91 detects a command value SE2 obtained by the decelerator pedal 69 through the potentiometer 691 (processing S2).

(2) The operation state judgment portion 91 judges a largeness relationship between the command value SE1 and the command value SE2 (processing S3).

Figure 5:
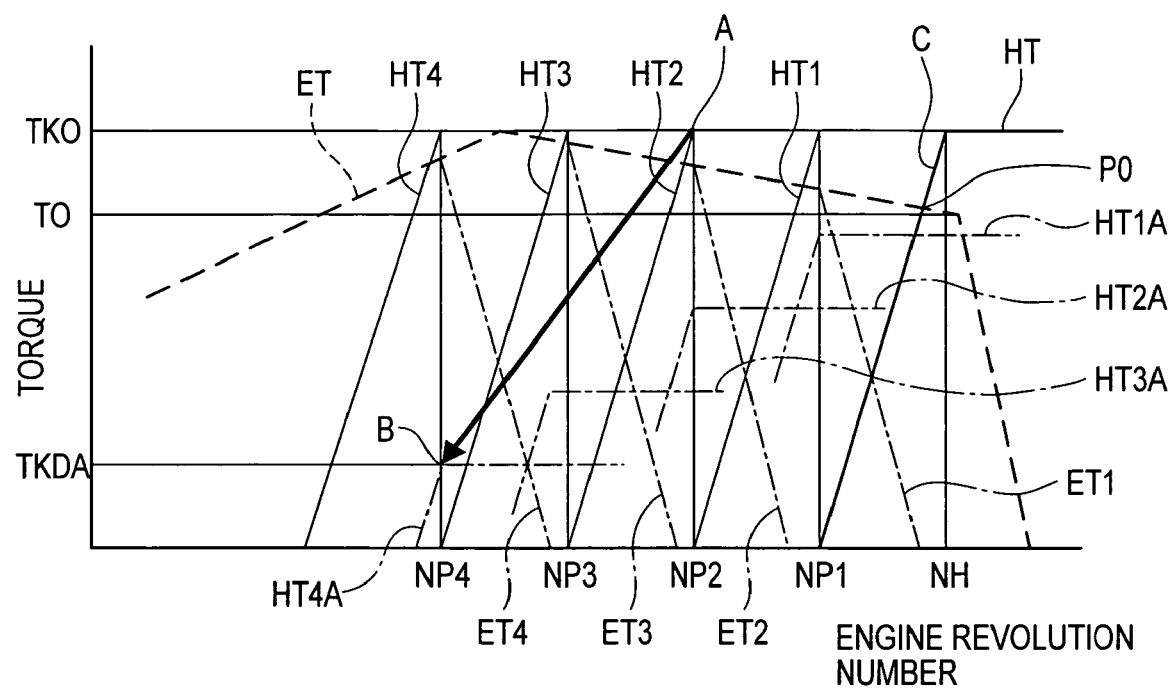
FIG. 5 is a view showing an example of a displacement control of the HST device in the first embodiment.

(3) When the fuel adjustment lever 68 is operated, the decelerator pedal 69 also swivels concurrently with this operation. Therefore, in a normal operation state, the command value SE1=the command value SE2 is detected. In this case, the displacement control command generation portion 94 selects the first displacement control pattern stored in the displacement control pattern storage portion 93 (processing S4), and generates a displacement control command based on this selected pattern (processing S5). Specifically, as shown in FIG. 5, the displacement control command generation portion 94 selects such a first displacement control pattern as that the absorption torque curves HT1, HT2, HT3 and HT4 can be obtained so that the absorbable torque based on the HST device 7 becomes the maximum torque TK0 irrespective of the target revolution number of the engine 5 set by operating the fuel adjustment lever 68. Furthermore, the displacement control command generation portion 94 generates and outputs a control command to the EPC valve 714 which changes the cam plate angle of the variable displacement pump 711 constituting the HST device 7 so that the absorption torque having the selected first displacement control pattern is obtained. When such a control command is output, the EPC valve 714 is operated in the HST device 7 and a displacement control over the variable displacement pump 711 is carried out (processing S6).

(4) It is to be noted that, as shown in FIG. 5, with the first displacement control pattern, the target revolution number NH based on the potentiometer 681 on the fuel adjustment lever 68 side determined as a starting point of the displacement reduction control and a control for reducing the absorption torque as the engine revolution number is decreased is performed, thereby avoiding the engine stall of the engine 5. As a result, as shown in FIG. 5, in the high-idle state, the engine torque curve ET crosses the absorption torque curve HT in a revolution number region which is slightly lower than the rated point P0. That is, all of the torque generated by the engine 5 is absorbed by the HST device 7 in the vicinity of the engine rated revolution number NH. Moreover, when a traveling resistance is increased and the engine revolution number is reduced, the torque which is absorbed by the HST device 7 is rapidly decreased, thereby avoiding the engine stall. By performing the control with such characteristics, the engine can constantly revolve at or near the rated revolution number NH and all of the torque generated by the engine can be transmitted to the traveling device through the HST device 7. Therefore, the dirt conveying operation or the like can be vigorously and rapidly performed by effectively using an engine output. When a load is reduced by, e.g., manipulating the moldboard 3 by an operator, the engine revolution number is increased, and hence the controller 9 returns the displacement of the variable displacement pump to the maximum displacement Q0.

(5) When an operator steps on the decelerator pedal 69 in order to stop the bulldozer 1, its command value SE2 is detected by the potentiometer 691, and the operation state judgment portion 91 of the controller 9 determines that the command value SE1>the command value SE2 and determines that the command value SE2 according to the target revolution number from the potentiometer 691 is lower than the command value SE1 concerning the target revolution number based on a signal from the potentiometer 691. The displacement control command generation portion 94 selects the second displacement control pattern from the displacement control pattern storage portion 93 based on this judgment result (processing S7), generates a displacement control command in a deceleration mode (processing S8), and carries out a control over the variable displacement pump 711 (processing S9) as mentioned above.

(6) That is, the displacement control command generation portion 94 of the controller 9 performs a control for changing the absorption torque curve of the HST device 7 as HT1A, HT2A . . . as shown in FIG. 5 based on a pushing quantity of the decelerator pedal 69 obtained from the potentiometer 691. The displacement control pattern of the HST device 7 when the decelerator pedal 69 is pushed down has characteristics which reduce the absorption torque obtained by the HST device 7 as a pushing quantity of the decelerator pedal 69 is increased. Therefore, an output from the HST device 7 is reduced in accordance with a pushing quantity of the decelerator pedal 69, and a vehicle speed is decreased.

(7) When a fuel injection quantity to the engine 5 is restricted by operating the fuel adjustment lever 68, an engine revolution number is reduced, and the engine torque curve apparently changes as ET1, ET2, ET3, ET4 . . . as shown in FIG. 5. An operation quantity of the fuel adjustment lever 68 is detected by the potentiometer 681, and the displacement control command generation portion 94 changes the absorption torque curve of the HST device 7 as HT1, HT2, HT3, HT4 . . . based on this detection value (i.e., the target revolution number set by the fuel adjustment lever 68). As is evident from FIG. 5, all the absorption torque curves HT1, HT2, HT3 and HT4 are set to cross the engine torque curve ET in a region of a revolution number slightly lower than each of the target revolution numbers NP1, NP2, NP3 and NP4. That is, when the engine revolution number is restricted by operating the fuel adjustment lever 68, all of the torque generated by the engine is absorbed by the HST device 7. Therefore, since all of the torque generated by the engine can be transmitted to the traveling device through the HST device 7 even in the partial operation, the engine output can be effectively used to vigorously perform a dirt conveying work and the like.

(8) The controller 9 compares the command value SE1 of the target revolution number obtained by the potentiometer 681 as the fuel adjustment position detection portion with the command value SE2 of the target revolution number obtained by the decelerator pedal 69 acquired from the detection value of the potentiometer 691 as the deceleration operation position detection portion. When the two target revolution numbers are equal to each other, the controller 9 gives preference to the detection value obtained by the potentiometer 681 of the fuel adjustment lever 68. When the two target revolution numbers are different from each other, the controller 9 performs a displacement control over the HST device 7 based on the command value with which the lower target revolution number is set.

(9) When the fuel adjustment lever 68 is manipulated to perform the partial operation, and the decelerator pedal 69 is pushed down to reduce the engine revolution number to NP4 in a state where a control for changing the absorption curve to HT2 shown in FIG. 5 is carried out, for example, if the apparent engine torque curve shown in FIG. 5 enters a state indicated by ET4, in this embodiment, since the fuel adjustment lever 68 does not move even if the decelerator pedal 69 is pushed down, the target revolution number NP4 set by the decelerator pedal 69 becomes lower than the target revolution number NP2 set by the fuel adjustment lever 68. Therefore, the controller 9 controls a displacement of the HST device 7 to change to a small displacement TKDA from TX0 based on the command value of the potentiometer 691 on the decelerator pedal 69 side. That is, the controller 9 executes a control to change the absorption torque curve to HT4A shown in FIG. 4. In this case, the control for reducing a displacement of the HST device 7 by the controller 9 is executed in such a manner that a displacement of the HST device 7 continuously changes from TK0 to the small displacement TKDA as indicated by an arrow from a point A to a point B in FIG. 4.

[5] Modification of Embodiment

It is to be noted that the present invention is not restricted to the foregoing embodiment and it includes the following modification.

As different from the above-described embodiment, in cases where there is adopted a mechanism in which a position of the decelerator pedal 69 remains unchanged even if the fuel adjustment lever 68 is moved, the control of giving preference to the detection value of the potentiometer 681 of the fuel adjustment lever 68 is not necessarily required when the target revolution number set by the fuel adjustment lever 68 matches with the target revolution number set by the decelerator pedal 69. When the both target revolution values are different from each other, executing a control based on the potentiometer detection value with the lower revolution number can suffice.

Further, the fuel adjustment lever 68 and the decelerator pedal 69 may not be mechanically coupled with the fuel injection pump 52 of the engine 5, but the fuel injection pump may be controlled by the controller through an electrical signal.

Furthermore, in the foregoing embodiment, a control is performed while maintaining the absorbable torque of the HST device 7 at TK0 larger than the torque generated by the engine in a state where the decelerator pedal 69 is not pushed down in the partial operation. That is, when the engine revolution number is restricted by manipulating the fuel adjustment lever 68, the absorption torque curves HT1, HT2 . . . are all set to cross the engine torque curve ET in order to cause the hydrostatic transmission to absorb all of the torque generated by the engine. However, the two types of the curves are not necessarily set to cross each other. For example, the torque generated by the engine may be effectively exploited by controlling the absorbable torque of the HST device 7 so that a displacement which matches in the vicinity of the maximum torque generated by the engine 5 can be obtained by enabling absorption of a torque slightly lower than the torque generated by the engine 5. That is, if a drive force which is required in the partial operation can be obtained, the absorbable torque of the HST device 7 may be slightly lower than the torque generated by the engine. It is important to definitely differentiate a reduction in engine revolution number by an operation of the fuel adjustment lever 68 and a reduction in engine revolution number by an operation of the decelerator pedal 69 and use each displacement control pattern of the HST device 7 depending on these two operations.

Furthermore, although the description has been given as to the example of the bulldozer, the present invention can be also applied to other working vehicles. Although the description has been given as to the hydrostatic transmission which comprises the non-illustrated variable displacement pump driven by the engine 5 and the non-illustrated variable displacement motor which rotates upon receiving a pressure oil from the variable displacement pump, and changes a cam plate angle of the variable displacement hydraulic pump or the variable displacement hydraulic motor, there may be adopted a hydrostatic transmission which changes a cam plate angle of each of the variable displacement hydraulic pump and the variable displacement hydraulic motor, or a hydrostatic transmission which changes a cam plate angle of the variable displacement hydraulic pump or the variable displacement hydraulic motor in a combination of the variable displacement hydraulic pump and a fixed displacement hydraulic motor or a combination of the fixed displacement hydraulic pump or a variable displacement hydraulic motor.

Besides, the specific structure, shape and others when embodying the present invention may be any other structure and the like as long as the object of the present invention can be attained.

The priority application Number JP 2004-012507 upon which this patent application is based is hereby incorporated by reference.

What is claimed is:

1. A hydrostatic transmission vehicle which travels by converting an output from an engine through a hydrostatic transmission, the vehicle comprising:
    a fuel adjustment portion which restricts an engine revolution number;
    a deceleration operation portion which reduces a vehicle speed by decreasing the engine revolution number;
    a fuel adjustment position detection portion which detects an operation position of the fuel adjustment portion;
    a deceleration operation position detection portion which detects an operation quantity of the deceleration operation portion; and
    a controller which controls a displacement of the hydrostatic transmission;
    wherein the controller comprises:
        an operation state judgment portion which judges operation states of the fuel adjustment portion and the deceleration operation portion based on detection values obtained from the fuel adjustment position detection portion and the deceleration operation position detection portion;
        a displacement control pattern storage portion which stores a first displacement control pattern with which a displacement of the hydrostatic transmission is controlled so that all of a torque generated by the engine is absorbed by the hydrostatic transmission and a second displacement control pattern with which a displacement of the hydrostatic transmission is controlled so that a torque absorbed by the hydrostatic transmission becomes not more than a torque generated by the engine; and
        a displacement control command generation portion which generates a displacement control command to perform displacement control based on the first displacement control pattern when the operation state judgment portion determines that the engine revolution number is restricted by the fuel adjustment portion, and to perform displacement control based on the second displacement control pattern when the operation state judgment portion determines that the engine revolution number is restricted by the deceleration operation portion.

2. The hydrostatic transmission vehicle according to claim 1, wherein the operation state judgment portion compares a target revolution number of the engine obtained from the detection value acquired by the fuel adjustment position detection portion with a target revolution number of the engine obtained from the detection value acquired by the deceleration operation position detection portion, and
    wherein when the target revolution numbers are different from each other, the operation state judgment portion determines that the engine revolution number is being restricted by one of the fuel adjustment portion and the deceleration operation portion from which a lower target revolution number is obtained.

3. A controller for a controlling a displacement of a hydrostatic transmission used for a hydrostatic transmission vehicle, which travels by converting an output from an engine through the hydrostatic transmission, and which includes a fuel adjustment portion which restricts an engine revolution number and a deceleration operation portion which reduces a vehicle speed by decreasing the engine revolution number, the controller comprising:
    an operation state judgment portion which judges operation states of the fuel adjustment portion and the deceleration operation portion based on detection values obtained from the fuel adjustment position detection portion and the deceleration operation position detection portion;
    a displacement control pattern storage portion which stores a first displacement control pattern with which a displacement of the hydrostatic transmission is controlled so that all of a torque generated by the engine is absorbed by the hydrostatic transmission and a second displacement control pattern with which a displacement of the hydrostatic transmission is controlled so that a torque absorbed by the hydrostatic transmission becomes not more than a torque generated by the engine; and
    a displacement control command generation portion which generates a displacement control command to perform displacement control based on the first displacement control pattern when the operation state judgment portion determines that the engine revolution number is restricted by the fuel adjustment portion, and to perform displacement control based on the second displacement control pattern when the operation state judgment portion determines that the engine revolution number is restricted by the deceleration operation portion.

4. The controller for controlling a displacement of a hydrostatic transmission according to claim 3, wherein the operation state judgment portion compares a target revolution number of the engine obtained from the detection value acquired by the fuel adjustment position detection portion with a target revolution number of the engine obtained from the detection value acquired by the deceleration operation position detection portion, and wherein when the target revolution numbers are different from each other, the operation state judgment portion determines that the engine revolution number is being restricted by one of the fuel adjustment portion and the deceleration operation portion from which a lower target revolution number is obtained.

* * * * *